United States Patent
Hibino et al.

(10) Patent No.: US 7,909,722 B2
(45) Date of Patent: Mar. 22, 2011

(54) STRUCTURE OF SWING PART OF INDUSTRIAL ROBOT

(75) Inventors: Toshiharu Hibino, Mie (JP); Masakazu Kurita, Mie (JP)

(73) Assignee: Nabtesco Corporation, Tokyo (JP)

( * ) Notice: Subject to any disclaimer, the term of this patent is extended or adjusted under 35 U.S.C. 154(b) by 603 days.

(21) Appl. No.: 11/817,081

(22) PCT Filed: Mar. 29, 2006

(86) PCT No.: PCT/JP2006/306558
§ 371 (c)(1),
(2), (4) Date: Dec. 4, 2007

(87) PCT Pub. No.: WO2006/104216
PCT Pub. Date: Oct. 5, 2006

(65) Prior Publication Data
US 2008/0287240 A1    Nov. 20, 2008

(30) Foreign Application Priority Data

Mar. 29, 2005   (JP) .................................. 2005-095254
Mar. 14, 2006   (JP) .................................. 2006-068586

(51) Int. Cl.
*F16H 1/32* (2006.01)
*F16H 3/70* (2006.01)

(52) U.S. Cl. .......................... 475/168; 475/170; 475/178

(58) Field of Classification Search .......... 475/168–170, 475/177, 178
See application file for complete search history.

(56) References Cited

U.S. PATENT DOCUMENTS

| 4,050,331 A * | 9/1977 | Braren .......................... 475/168 |
| 4,690,010 A | 9/1987 | Matsumoto et al. |
| 4,846,018 A * | 7/1989 | Matsumoto et al. .......... 475/149 |
| 4,909,102 A * | 3/1990 | Haga .............................. 475/168 |
| 5,695,425 A * | 12/1997 | Hashimoto et al. ........... 475/180 |
| 6,508,737 B2 * | 1/2003 | Fujimoto ....................... 475/178 |
| 7,476,174 B2 * | 1/2009 | Fujimoto ....................... 475/177 |
| 2003/0134708 A1 * | 7/2003 | Regner .......................... 475/178 |

FOREIGN PATENT DOCUMENTS

| EP | 0 222 915 A1 | 5/1987 |
| EP | 1 396 314 A1 | 3/2004 |
| JP | 58-054255 A | 3/1983 |
| JP | 62-004586 A | 1/1987 |
| JP | 03-181641 A | 7/1991 |
| JP | H03-75345 U | 7/1991 |

* cited by examiner

*Primary Examiner* — Tisha D Lewis
(74) *Attorney, Agent, or Firm* — Panitch Schwarze Belisario & Nadel LLP (57) ABSTRACT

Surface abrasion in an eccentric part of a crank pin or breakdown of the crank pin of an eccentric oscillation speed reducer is effectively prevented. A value N obtained by dividing reduction ratio M in an eccentric oscillation speed reducer by a diameter D passing a center of pin teeth is set to be smaller than 0.20. As the results, temperature of lubricant in the eccentric oscillation speed reducer can be depressed below 60° C., even though an output rotation speed at a rated torque of the eccentric oscillation speed reducer has become 28 rpm or more as required from a tact time or so in a factory, whereby a region between the eccentric part of the crank pin and a needle-shaped roller bearing is always lubricated with the lubricant which exerts required lubricating function.

3 Claims, 5 Drawing Sheets

STRUCTURE OF SWING PART OF INDUSTRIAL ROBOT

CROSS-REFERENCE TO RELATED APPLICATION

This application is a Section 371 of International Application No. PCT/JP2006/306558, filed Mar. 29, 2006, which was published in the Japanese language on Oct. 5, 2006, under International Publication No. 2006/104216, the disclosure of which is incorporated herein by reference.

TECHNICAL FIELD

The present invention relates to a structure of a swing part of an industrial robot employing an eccentric oscillation type speed reducer.

BACKGROUND ART

As a conventional structure of a swing part of an industrial robot, a structure of a type as disclosed in Japanese Patent Publication No. JP-A-62-4586 has been known.

This structure includes a fixed part and a rotary part of an industrial robot, a front stage speed reducer which reduces speed of rotation inputted from a drive motor and outputs the rotation at the reduced speed, and a main speed reducer which reduces the speed of the rotation from the front stage speed reducer and outputs the rotation to the rotary part, wherein an eccentric oscillation type speed reducer which includes a casing provided with a number of pin teeth on its inner periphery, a pinion contained in the casing and having external teeth in mesh with the pin teeth, a carrier inserted into the casing and adapted to rotate relative to the casing, and a plurality of crank pins rotatably supported by the carrier and having eccentric parts respectively inserted into the pinion, the crank pins being rotated synchronously with the rotation inputted from the front stage speed reducer thereby to rotate the pinion eccentrically, wherein either one of the casing and the carrier is fixed to the fixed part, and the reduced rotation is outputted from the other of the casing and the carrier to the rotary part is employed as the main speed reducer, and an external gear speed reducer including first external gears which are provided at input side ends of all the crank pins, and a second external gear which is coaxial with the casing or the carrier and to which the rotation from the drive motor is inputted is employed as the front stage speed reducer.

DISCLOSURE OF THE INVENTION

Problems that the Invention is to Solve

Recently, because demand for downsizing of the industrial robot and for speedup of working speed has increased more and more, a compact motor with high rotation speed has been used as a drive motor. On the other hand, an attempt to obtain requisite output rotation speed and output torque, by increasing total reduction ratio of the above described front stage speed reducer and the main speed reducer, has been made. However, it has been found that after a long use of such structure, surface abrasion may occur in the eccentric part of the crank pin of the main speed reducer (the eccentric oscillation type speed reducer), which will finally lead to breakdown of the crank pin.

Under the circumstances, the inventor has eagerly made research to elucidate a mechanism leading to the breakdown of the crank pin as described above, and has found that the above described breakdown is attributed to the following mechanism. Specifically, a lubricant (oil, grease) filled in the main speed reducer (the eccentric oscillation type speed reducer) is heated up to such a temperature (generally about 60° C.) that lubricating function may be largely lowered, due to friction between the eccentric part of the crank pin and a needle shaped roller bearing. As the results, a lubricant film of the lubricant which lubricates a region between the eccentric part and the needle-shaped roller bearing will be partially lost, and a metal contact between the eccentric part and the needle-shaped roller bearing will occur. This is the mechanism of the above described breakdown.

Then, the inventor has further pursued the research, and has made tests for seeking relationship between the output torque and the output rotation speed when the lubricant is saturated at 60° C., as described below, in a medium-sized main speed reducer (the eccentric oscillation type speed reducer) which is used in a wrist joint or the like of the industrial robot and in which a diameter D passing a center of the pin teeth is in a range of 150 to 200 mm. The output rotation speed of more than 28 rpm at a rated torque is often required in the main speed reducer (the eccentric oscillation type speed reducer) from a tact time or so in a factory. However, the inventor has found from the result of the tests, as described below, that a value N obtained by dividing reduction ratio M in the main speed reducer (the eccentric oscillation type speed reducer) by the diameter D should be smaller than 0.20, so that the temperature of the lubricant may not rise above 60° C. at such rotation speed.

This invention has been made from the above described finding, and there is provided a structure of a swing part of an industrial robot including a fixed part and a rotary part of the industrial robot, a front stage speed reducer provided between the fixed part and the rotary part which reduces speed of rotation inputted from a drive motor and outputs the rotation at the reduced speed, and a main speed reducer which reduces the speed of the rotation from the front stage speed reducer and outputs the rotation to the rotary part, wherein an eccentric oscillation type speed reducer which includes a casing provided with a number of pin teeth on its inner periphery, a diameter D of a circle passing a center of the pin teeth being in a range of 150 to 200 mm, a pinion contained in the casing and having external teeth in mesh with the pin teeth, a carrier inserted into the casing and adapted to rotate relative to the casing, and a plurality of crank pins rotatably supported by the carrier and having eccentric parts respectively inserted into the pinion, the crank pins being rotated synchronously with the rotation inputted from the front stage speed reducer thereby to rotate the pinion eccentrically, wherein either one of the casing and the carrier is fixed to the fixed part, and the reduced rotation is outputted from the other of the casing and the carrier to the rotary part is employed as the main speed reducer, and an external gear speed reducer including first external gears which are provided at input side ends of all the crank pins, and a second external gear which is coaxial with the casing or the carrier and to which the rotation from the drive motor is inputted is employed as the front stage speed reducer, total reduction ratio of the external gear speed reducer and the eccentric oscillation type speed reducer being 80 to 200, characterized in that a value N obtained by dividing reduction ratio M in the eccentric oscillation type speed reducer by the diameter D is smaller than 0.20.

Advantage of the Invention

In this invention, because the value N obtained by dividing the reduction ratio M in the eccentric oscillation type speed reducer by the diameter D is set to be smaller than 0.20, it is possible to depress temperature of the lubricant filled in the eccentric oscillation type speed reducer below 60° C., even though the output rotation speed at the rated torque of the eccentric oscillation type speed reducer has become 28 rpm or more, as required from a tact time or so in a factory. In this manner, lubricating function of the lubricant will not be largely lowered, and a region between the eccentric part of the crank pin and the needle-shaped roller bearing will be always lubricated with the lubricant which exerts required lubricating function. As the results, surface abrasion in the eccentric part of the crank pin and breakdown of the crank pin will be effectively prevented.

Moreover, in case where the value N is set to be smaller than 0.17, the temperature of the lubricant can be depressed below 60° C., even though the output rotation speed of the eccentric oscillation type speed reducer has become about 30 rpm.

Further, in case where a small gear coaxial with the casing or the carrier is provided at an output end of the casing or the carrier which inputs the reduced rotation, and a large gear in mesh with the small gear is provided on the rotary part, so that a rear stage speed reducer including these small and large gears may further reduce the speed of the rotation, it is possible to easily form a large diameter through hole through which cables or the like can be passed, and to make the eccentric oscillation type speed reducer compact.

BEST MODE FOR CARRYING OUT THE INVENTION

Now, Embodiment 1 of the invention will be described referring to the drawings.

Embodiment 1

Figure 1:
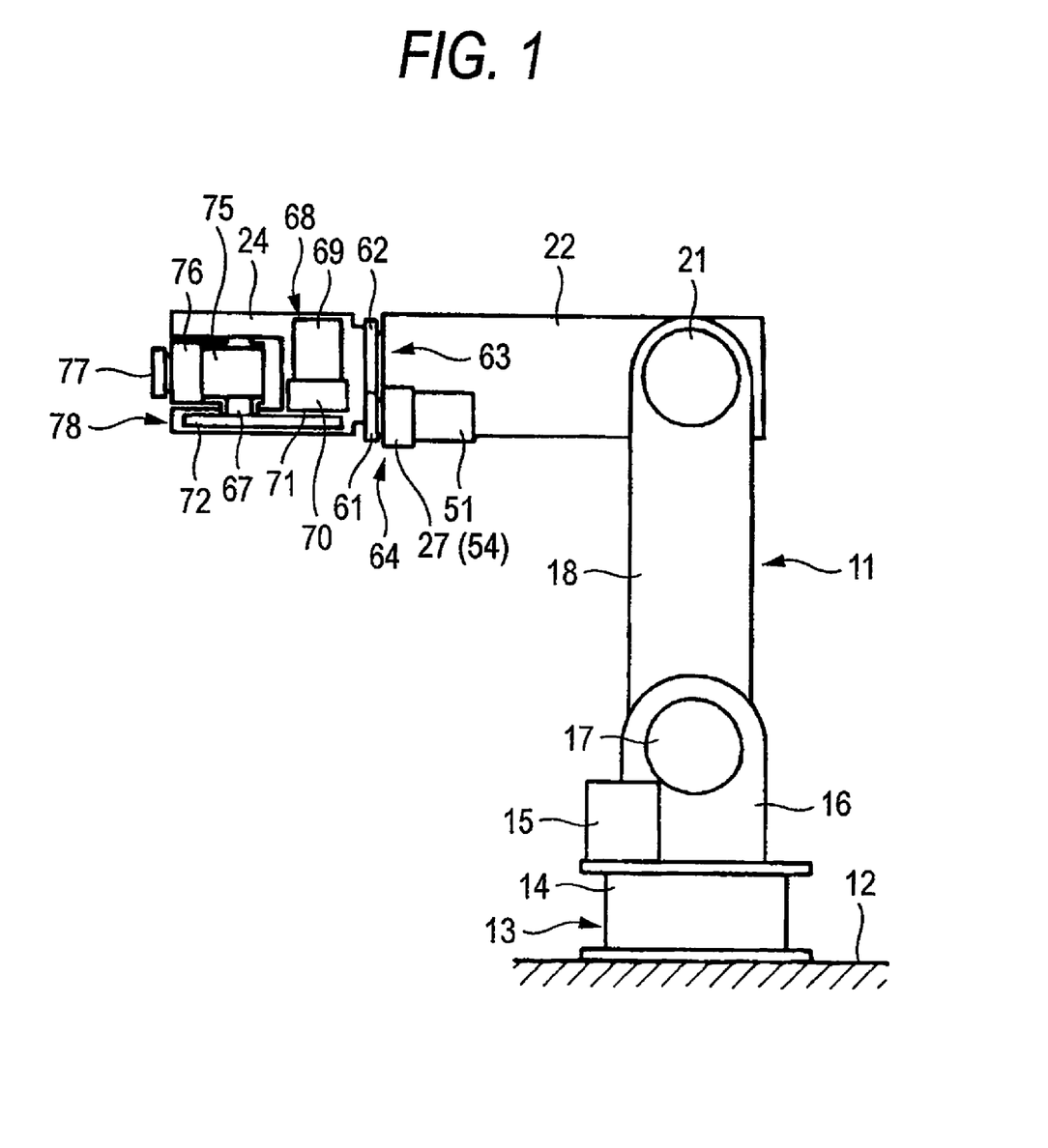
FIG. 1 is a schematic front view partly cut away showing Embodiment 1 according to the invention.
Figure 2:
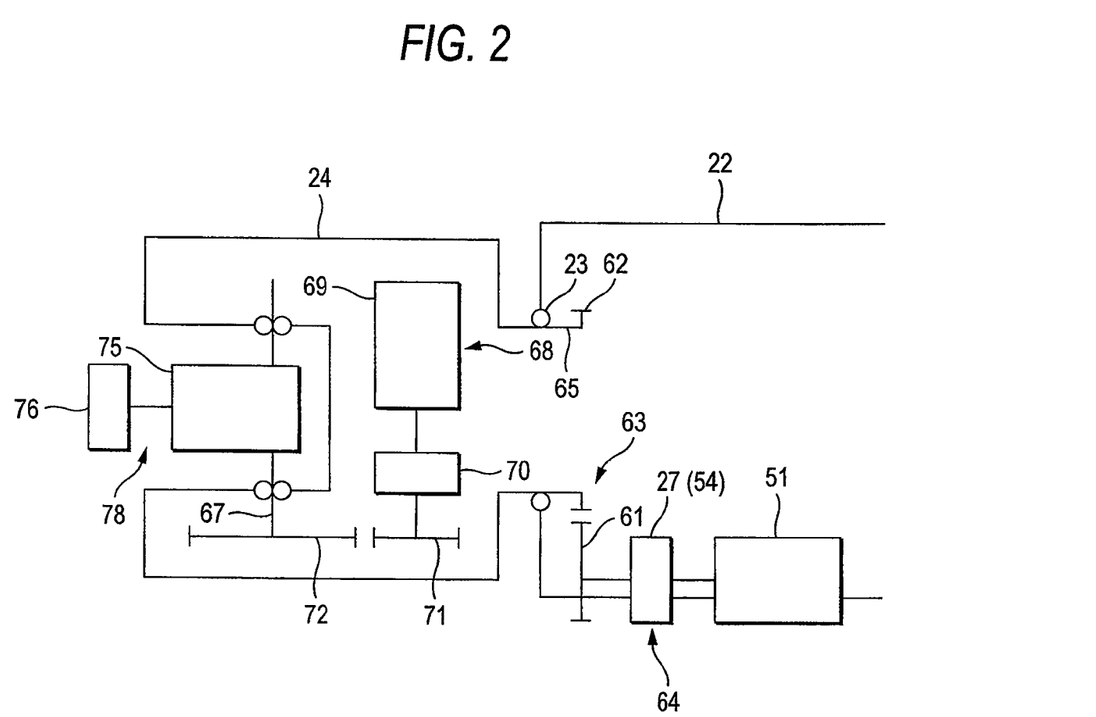
FIG. 2 is a schematic front view in section showing an area including a hand.

In FIGS. 1 and 2, numeral 11 designates an industrial robot. This industrial robot 11 has a speed reducer 14 in a first joint part 13 which is installed on a floor 12. This speed reducer 14 will reduce speed of rotation which has been inputted from a drive motor 15, and output the rotation to a base end arm (a swing head) 16 at the reduced speed, thereby to rotate the base end arm 16 around a vertical first axis. A lower end of a first arm 18 extending in a substantially vertical direction is connected to an upper end of the base end arm 16 so as to rotate around a horizontal second axis. This first arm 18 will turn in a lateral direction around the second axis by receiving a driving force of a reduced speed from a second joint part 17 which has substantially the same structure as the first joint part 13 including the speed reducer 14 and the drive motor 15.

A base end of a second arm 22 as the fixed part which extends substantially horizontally is connected to an upper end of the first arm 18 so as to rotate around a horizontal third axis. This second arm 22 can turn in the vertical direction around the third axis by receiving a driving force of a reduced speed from a third joint part 21 which has substantially the same structure as the second joint part 17. A hand 24 as the rotary part which is coaxial with the second arm 22 is held at a distal end part of the second arm 22 so as to rotate around a fourth axis which extends along a center axis of the second arm 22.

In FIGS. 1, 2, 3 and 4, numeral 27 designates an eccentric oscillation type speed reducer as the main speed reducer, which is provided outside of the distal end part of the second arm 22. This eccentric oscillation type speed reducer 27 has a casing 28 in a substantially cylindrical shape, and a number of pin teeth 29 are provided on an inner periphery of the casing 28 at a middle part thereof in an axial direction, at equal intervals in a circumferential direction. In this embodiment, the eccentric oscillation type speed reducer 27 is a medium-sized speed reducer which is used for actuating the hand 24 of the industrial robot 11, as described above, and therefore, a diameter D passing a center of the pin teeth 29 is usually in a range of 150 to 200 mm.

Figure 3:
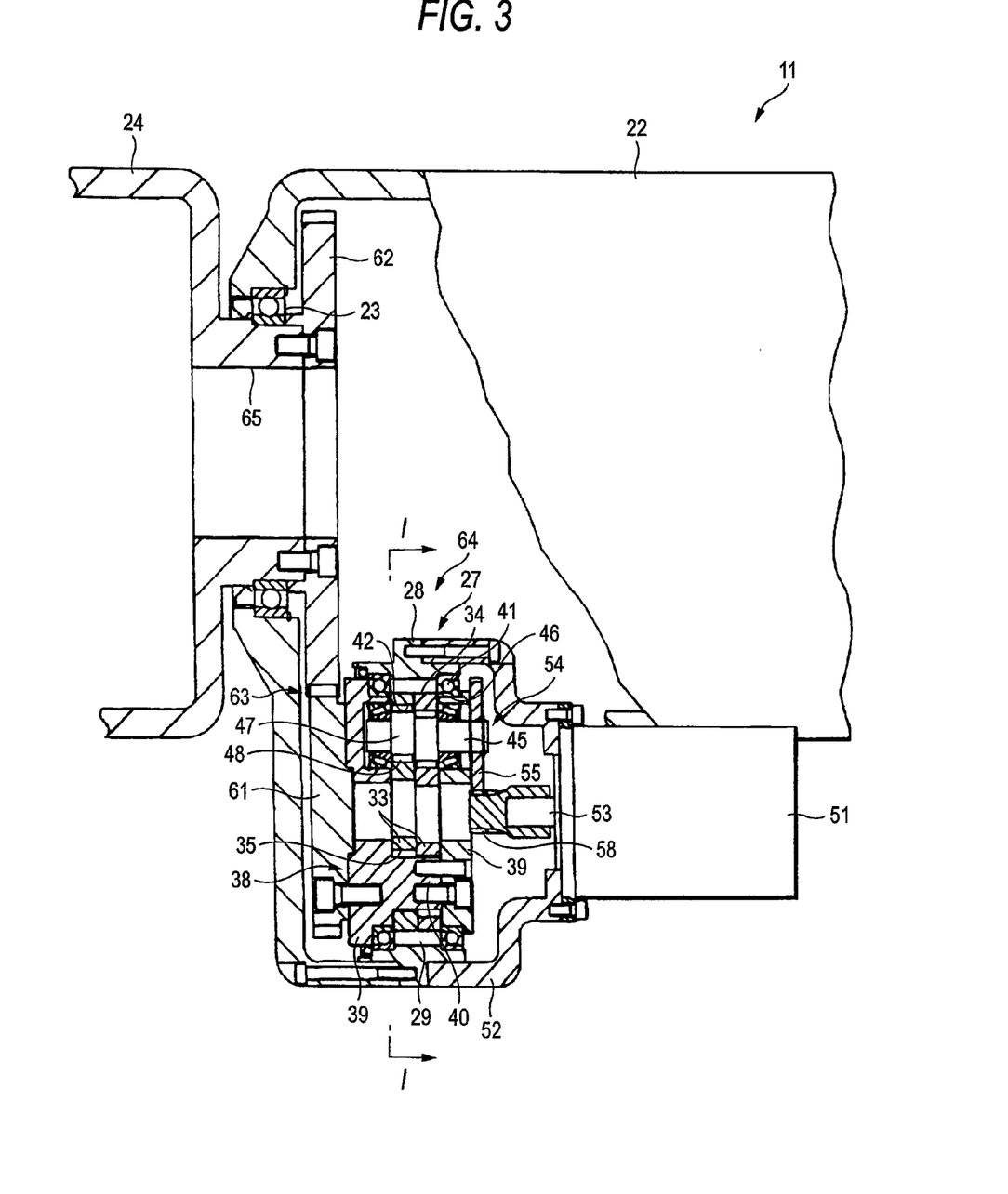
FIG. 3 is a front view partly cut away showing an area including a main speed reducer and a front stage speed reducer.
Figure 4:
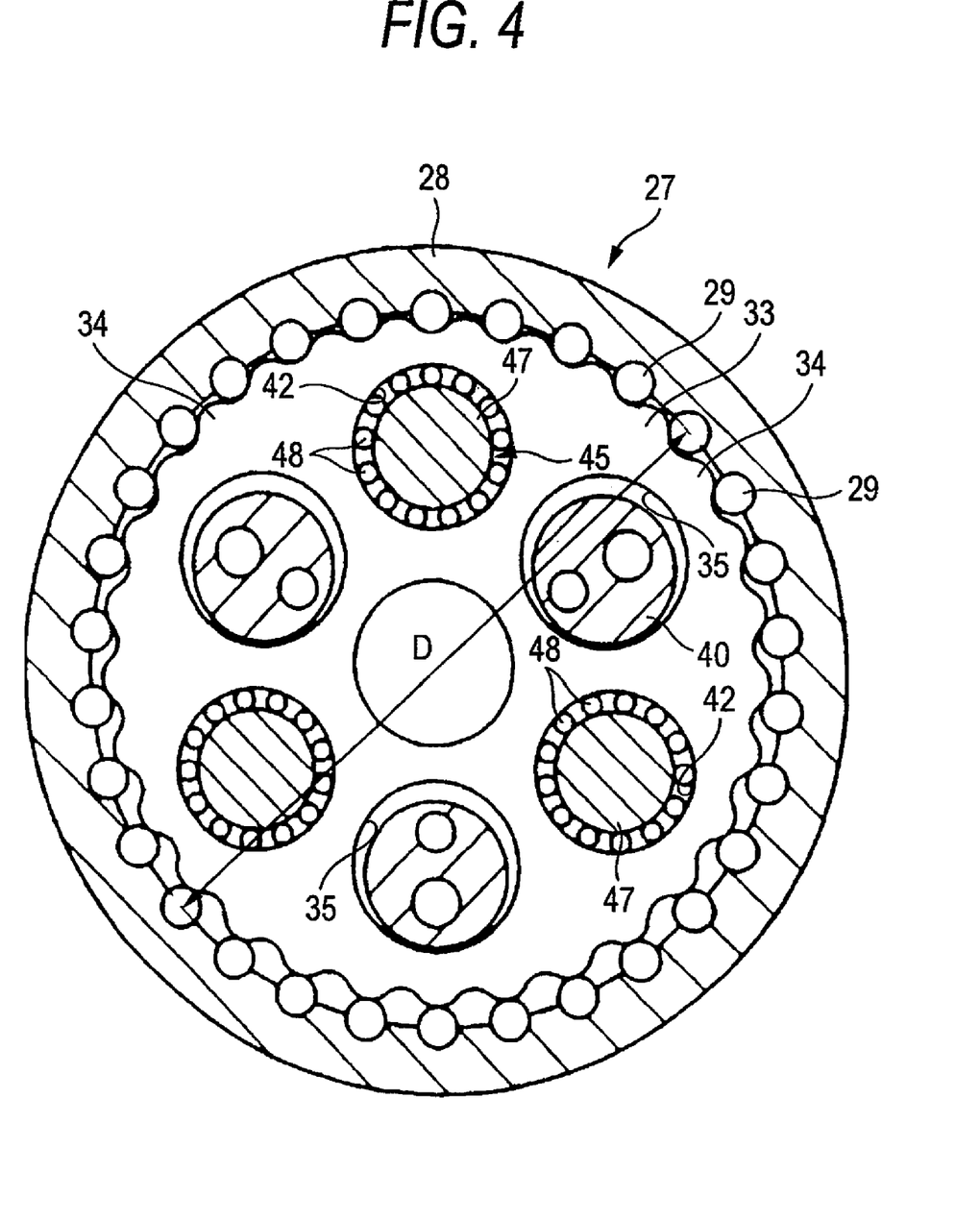
FIG. 4 is a sectional view as seen in a direction of arrow marks I-I in FIG. 3.

A plurality of (two in this embodiment) pinions 33 having a ring-like shape are contained in the casing 28 in parallel in the axial direction, and a number of external teeth 34 having a trochoid tooth profile are respectively formed on outer peripheries of these pinions 33. In this embodiment, the number of the external teeth 34 of the pinion 33 is rather smaller than the number of the pin teeth 29, by one in this embodiment. Moreover, the external teeth 34 are meshed with the pin teeth 29 in a state where the pinion 33 is in internal contact with the casing 28, and the largest meshed parts (positions of the deepest mesh) are offset in phase by 180 degree between the two pinions 33. Each of the pinions 33 is provided with a plurality of (three) through holes 35 passing through in the axial direction, at equal intervals in the circumferential direction.

Numeral 38 designates a carrier inserted into the casing 28. This carrier 38 includes a pair of end plates 39 having a ring-like shape and arranged outside of the two pinions 33 in the axial direction, and a plurality of (the same number as that of the throughholes 35) posts 40. Numeral 41 designates a pair of bearings 41 which are interposed between the carrier 38, specifically outer peripheries of the two end plates 39, and an inner periphery of the casing 28 at both end pars thereof in the axial direction. The carrier 38 is held by means of these bearings 41 so as to rotate relative to the casing 28. Numeral 42 designates a plurality of (three) crank shaft holes 42 extending in the axial direction which are formed in the respective pinions 33. These crankshaft holes 42 are separated at equal intervals in the circumferential direction, and arranged alternately with the through holes 35.

Numeral 45 designates a plurality of (the same number as that of the crank shaft holes 42) crank pins. These crank pins 45 are arranged at an equal angle in the circumferential direction. Bearings 46 are respectively interposed between both end portions of the crank pins 45 in the axial direction and the carrier 38, specifically both the end plates 39, whereby both the end portions of the crank pins 45 in the axial direction are rotatably supported by the carrier 38. The crank pins 45 have eccentric parts 47 of the same number (two) as the pinions 33 which are offset by an equal distance from a center axis of the crank pin 45, in a middle part thereof in the axial direction. These eccentric parts 47 are separated by a small distance from each other in the axial direction, and are offset in phase from each other by 180 degree. The eccentric parts 47 of the crank pins 45 are respectively inserted into the crank shaft holes 42 of the pinions 33 interposing needle-shaped roller bearings 48, and as the results, the pinions 33 and the crank pins 45 are permitted to rotate relative to each other.

The above described casing 28, pinions 33, carrier 38, and crank pins 45 constitute, as a whole, the eccentric oscillation type speed reducer 27 as the above described main speed reducer which will reduce speed of the rotation inputted to the crank pins 45, and output the rotation to the casing 28 or the carrier 38 (the carrier 38 in this embodiment). The reduction ratio of the eccentric oscillation type speed reducer 27 is a value obtained by dividing the number of the pin teeth 29 of the casing 28 by a difference between the number of the pin teeth 29 and the number of the external teeth 34 of the pinion 33. In this embodiment, the number of the pin teeth 29 is 30, the number of the external teeth 34 is 29, and the difference between the numbers is 1. Therefore, the reduction gear ratio is 30.

The pinion 33 in which the difference between the number of the pin teeth 29 and the number of the external teeth 34 is 2 or more has been already proposed, for example, in Japanese Patent Publication No. JP-A-3-181641. In case where the pinion 33 of this type is employed too, the reduction gear ratio will be obtained in the same manner. The pinion 33 in which the difference between the numbers of the teeth is 2 or more means an external teeth gear which is obtained by displacing outer profiles of the pinions 33 in the circumferential direction by an angle obtained by dividing a pitch between the external teeth 34 by a difference between the numbers of the teeth, and taking out the overlapped parts of the outer profiles which have been circumferentially displaced, as a tooth profile.

Numeral 51 designates a drive motor which is attached to the casing 28 by means of a bracket 52. An output shaft 53 of this drive motor 51 is coaxial with the output part (the carrier 38) of the eccentric oscillation type speed reducer 27. Numeral 54 designates a front stage speed reducer which will reduce speed of the rotation inputted from the motor 51 (the output shaft 53) and output the rotation to the eccentric oscillation type speed reducer 27 as the main speed reducer. This front stage speed reducer 54 has a plurality of (the same number as the crank pins 45) first external gears 55 having a large diameter which are fixed to input side ends of all the crank pins 45. Numeral 58 designates a single second external gear having a smaller diameter than the first external gears 55 and fixed to the output shaft 53. The second external gear 58 is coaxial with the casing 28 or the carrier 38 (the carrier 38, in this embodiment) which inputs the reduced rotation and meshed with all the first external gears 55.

The above described first and second external gears 55, 58 constitute as a whole, the front stage speed reducer 54 including an external gear speed reducer. This front stage speed reducer 54 is not limited to a structure including the first external gears 55 and the second external gear 58 as in this embodiment, but may be a structure including two stages of spur gear trains. In case where the spur gear trains are provided in two stages in this manner, the external gears fixed to the crank pins 45 and the gear train in the second stage including the external gear meshed with the external gears may be at an equal ratio. In order to set the total reduction ratio of the front stage speed reducer 54 and the eccentric oscillation type speed reducer 27 to be 80 to 200 as described below, the reduction ratio of the front stage speed reducer 54 is preferably 2.5 to 6.5, and the reduction ratio of the eccentric oscillation type speed reducer 27 is preferably 25 to 36, so that the reduction ratio of the front stage speed reducer 54 may be within a range of 0.15 to 0.25 times of the reduction ratio of the eccentric oscillation type speed reducer 27.

When the rotation of the drive motor 51 is simultaneously transmitted to all the crank pins 45 after the speed of the rotation has been reduced by the front stage speed reducer 54, the crank pins 45 rotate around their own center axes, whereby the eccentric parts 47 of the crank pins 45 eccentrically rotate in the respective crank shaft holes 42 of the pinions 33, and the pinions 33 will be eccentrically rotated with oscillation. On this occasion, because the number of the external teeth 34 of each of the pinions 33 is rather smaller than the number of the pin teeth 29, the carrier 38 will be remarkably reduced in speed, and rotated at a low speed.

As described above, because demand for downsizing of the industrial robot 11 and speedup of working speed has recently increased more and more, a compact motor with high rotation speed has been used as the drive motor 51. On the other hand, an attempt to obtain requisite output rotation speed and output torque by increasing the total reduction ratio of the above described front stage speed reducer 54 and the eccentric oscillation type speed reducer 27 up to 80 to 200 has been made. However, the inventor has been found that after a long use of this structure, surface abrasion may occur in the eccentric parts 47 of the crank pins 45 in the eccentric oscillation type speed reducer 27, which will finally lead to breakdown of the crank pins 45.

The inventor has found that such phenomenon is attributed to the fact that the lubricant filled in the eccentric oscillation type speed reducer 27 will be heated up to such a temperature (generally about 60° C.) that lubricating function may be largely lowered by friction, as described above. Therefore, the inventor has prepared two sets of test speed reducers each including the front stage speed reducer 54 and the eccentric oscillation type speed reducer 27, and having different total reduction ratios from each other. Then, the inventor conducted tests for seeking relation between the output torque and the output rotation speed when the lubricant (grease) having whose consistency is number 00 specified by JIS K 2220 is saturated at the temperature of 60° C., by gradually increasing the output rotation speed in each of the test speed reducers, while the output torque is maintained at a certain value. It is to be noted that these tests have been conducted under most severe working conditions in which the test speed reducers have been continuously rotated in one direction.

During the tests, the reduction ratio of the front stage speed reducer 54 was 3, the number of the crank pins 45 was 3, environmental temperature was 20° C. in both the two test speed reducers. In the first test speed reducer, the diameter D of the eccentric oscillation type speed reducer 27 was 174 mm, the rated output torque was 1078 N.m, and the number of the pin teeth 29 was 60, whereby the reduction ratio M of the eccentric oscillation type speed reducer 27 was 60. In the second test speed reducer, the diameter D of the eccentric oscillation type speed reducer 27 was 179 mm, the rated output torque was 1323 N.m, and the number of the pin teeth 29 was 30, whereby the reduction ratio M of the eccentric oscillation type speed reducer 27 was 30. In the first test speed reducer, since the diameter D was 174 mm, the value N obtained by dividing the reduction ratio M by the diameter D was 0.34. In the second test speed reducer, since the diameter D was 179 mm, the value N obtained by dividing the reduction ratio M by the diameter D was 0.17.

Figure 5:
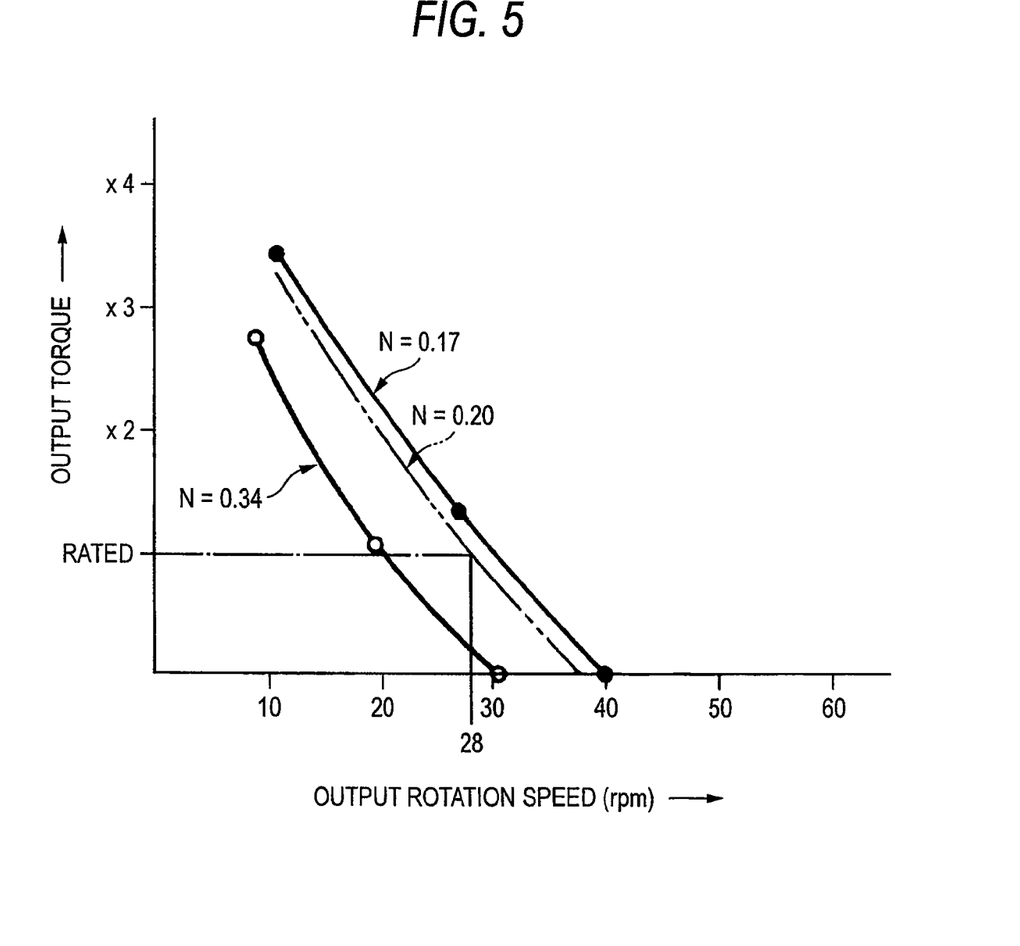
FIG. 5 is a graph showing relationship between an output torque and an output rotation speed when lubricant is saturated at a temperature of 60° C.

The results of the above described tests will be shown in FIG. 5. It is presumed that between a curve of the first test speed reducer (the value N is 0.34) and a curve of the second test speed reducer (the value N is 0.17), there exists a curve of a value N which is substantially parallel to these curves, under the same conditions as the above described, and reduced by 0.017 from the curve of the first test speed reducer to the curve of the second test speed reducer, as it is displaced by 1/10 of a distance between the two curves, because the output rotation speed is in a direct proportional relationship with an amount of heat generated by friction.

In the eccentric oscillation type speed reducer 27, it is required that the output rotation number (the output rotation number of the carrier 38) at the rated torque is 28 rpm or more from the tact time in the factory, as described above. In case where the output rotation number at the rated torque is 28 rpm, the saturation temperature of the lubricant will be 60° C. when the value N is 0.20. From this fact, in case where the value N in the eccentric oscillation type speed reducer 27 is set to be smaller than 0.20, the temperature of the lubricant filled in the eccentric oscillation type speed reducer 27 can be depressed below 60° C., even though the output rotation number at the rated torque in the eccentric oscillation type speed reducer 27 is 28 rpm or more as required from the tact time in the factory.

Accordingly, the lubricating function of the lubricant will not be remarkably lowered, and a region between the eccentric part 47 of the crank pin 45 and the needle-shaped roller bearing 48 will be always lubricated with the lubricant which exerts the required lubricating function. As the results, it is possible to effectively prevent a surface abrasion in the eccentric part 47 of the crank pin 45 and a breakdown of the crank pin 45. Particularly, in case where the value N is smaller than 0.17, the temperature of the lubricant can be depressed below 60° C., even though the output rotation speed of the eccentric oscillation type speed reducer 27 is about 30 rpm. However, in case where the value N is smaller than 0.07, it will be difficult to manufacture the eccentric oscillation type speed reducer 27, because the number of the pin teeth 29 becomes too small. Therefore, the value N is preferably larger than 0.07.

Again referring to FIGS. 1, 2, 3, and 4, a small gear 61 which is coaxial with an output end (the carrier 38) of the eccentric oscillation type speed reducer 27 is fixed to the output end of the eccentric oscillation type speed reducer 27 (the carrier 38 in this embodiment). On the other hand, a large gear 62 which is offset by a determined distance from the output end (the carrier 38) of the eccentric oscillation type speed reducer 27 and meshed with the small gear 61 is fixed to the base end of the hand 24. The above described small gear 61 and the large gear 62 constitute, as a whole, a rear stage speed reducer 63. The reason why the rear stage speed reducer 63 is provided at a rear stage of the eccentric oscillation type speed reducer 27 in this manner is because in the industrial robot 11 used in this embodiment, the output rotation speed more than 28 rpm is not required, while a large output torque is required. In case where the output rotation speed more than 28 rpm is required, the output from the eccentric oscillation type speed reducer 27 had better be directly transmitted to the rotary part, omitting the rear stage speed reducer 63.

By providing the rear stage speed reducer 63 including the small gear 61 and the large gear 62 at the rear stage of the eccentric oscillation type speed reducer 27 in this manner, it is possible to rotate the hand 24 of the industrial robot 11 at a low speed with a large torque. At the same time, because the large gear 62 can be provided offset from the eccentric oscillation type speed reducer 27, the drive motor 51 and the front stage reduction gear 54, it is possible to form a large diameter through hole 65 through which cables for driving and controlling, pipes and so on can be passed, easily in a center part of the large gear 62 and the base end of the hand 24. Moreover, because transmitted torque in the eccentric oscillation type speed reducer 27 has come to be a small value, the eccentric oscillation type speed reducer 27 can be made compact. The above described eccentric oscillation type speed reducer 27, the drive motor 51, the front stage speed reducer 54, and the rear stage speed reducer 63 constitute as a whole, a fourth joint part 64. The hand 24 will be rotated around the fourth axis which is substantially horizontal to the second arm 22, by the driving force outputted from this fourth joint part 64.

Numeral 67 designates a hand shaft in a substantially cylindrical shape which is rotatably held at the distal end part of the hand 24. This hand shaft 67 can rotate around a fifth axis which is perpendicular to the rotation axis of the hand 24. Numeral 68 designates a fifth joint part which will give a reduced driving force to the hand shaft 67 thereby to rotate the hand shaft 67 around the fifth axis. This fifth joint part 68 includes a drive motor 69, a speed reducer 70 which will output rotation outputted from the drive motor 69 at a reduced speed and has substantially the same structure as the eccentric oscillation type speed reducer 27 and the front stage speed reducer 54, a small gear 71 connected to an output end of the speed reducer 70, and a large gear 72 which is connected to the hand shaft 67 and meshed with the small gear 71.

Numeral 75 is a drive motor which is connected to the hand shaft 67. This drive motor 75 extends in a direction perpendicular to the rotation axis of the hand shaft 67. A speed reducer 76 having substantially the same structure as the speed reducer 70 is attached to the drive motor 75. This speed reducer 76 will reduce speed of the rotation driving force inputted from the drive motor 75 and transmit it to a tool mounting unit 77, thereby to rotate the tool mounting unit 77 around a sixth axis which is perpendicular to the rotation axis of the hand shaft 67.

The tool mounting unit 77 is provided with a welding device, a painting device or so which is driven and controlled by way of the cables for driving and controlling and the pipes passed through the hand shaft 67. The industrial robot 11 in this embodiment is particularly suitable as a handling robot, a spot welding robot and so on which are employed in a production line of automobiles. The above described drive motor 75, the speed reducer 76 constitutes, as a whole, a sixth joint part 78 which will give a driving force to the tool mounting unit 77 at a reduced speed, thereby to rotate the tool mounting unit 77 around the sixth axis. In this manner, the tool mounting unit 77 of the industrial robot 11 has six degrees of freedom, and can freely move the welding device or the like in three-dimensional directions to position it at a desired position and a desired posture.

Now, operation of the industrial robot in Embodiment 1 will be described.

In case of conducting welding work, for example, employing the industrial robot 11 as described above, the base end arm 16, the first arm 18, the second arm 22, the hand 24, the hand shaft 67 and the tool mounting unit 77 will be rotated around the first, second, third, fourth, fifth and sixth axes by operating the first joint part 13, the second joint part 17, the third joint part 21, the fourth joint part 64, the fifth joint part 68 and the sixth joint part 78, whereby the welding device mounted to the tool mounting unit 77 will be moved to a welding point of a work. The operation of the fourth joint part 64 will be described below, as a representative of the operations of the first joint part 13, the second joint part 17, the third joint part 21, the fourth joint part 64, the fifth joint part 68 and the sixth joint part 78 on this occasion.

When the drive motor 51 is operated to rotate the output shaft 53, the rotation of the output shaft 53 will be transmitted to all the crank pins 45 through the second external gear 58 and the first external gears 55, whereby the crank pins 45 will be rotated around their own center axes in the same direction and at the same speed. On this occasion, the eccentric parts 47 of the crank pins 45 eccentrically rotate in the crank shaft holes 42 of the pinion 33, whereby the pinion 33 will be eccentrically rotated with oscillation. Because the number of the external teeth 34 of the pinion 33 is smaller by one than the number of the pin teeth 29 of the casing 28, the carrier 38 and the small gear 61 will be rotated at a low speed which is reduced by the eccentric rotation with oscillation of the pinion 33. Thereafter, the rotation of the small gear 61 will be transmitted to the hand 24, as the rotary part, at the speed reduced by the large gear 62, whereby the hand 24 will be rotated.

Because the value N in the eccentric oscillation type speed reducer 27 at the fourth joint part 64 is set to be smaller than 0.20, the temperature of the lubricant filled in the eccentric oscillation type speed reducer 27 can be depressed below 60° C., even though the output rotation speed at the rated torque of the eccentric oscillation type reduction gear 27 is 28 rpm or more. In this manner, the lubricating function of the lubricant will not be largely lowered, and it is possible to effectively prevent the surface abrasion in the eccentric parts 47 of the crank pins 45 and the breakdown of the crank pins 45.

Moreover, in the above described embodiment, the casing 28 is fixed to the second arm 22 which is the fixed part, while the rotation with the reduced speed is outputted to the hand 24 which is the rotary part. However, according to the invention, it is also possible to fix the carrier to the fixed part, and to output the rotation with the reduced speed from the casing to the rotary part. Further, although the eccentric oscillation type speed reducer 27, the drive motor 51 and the front stage speed reducer 54 are provided outside of the second arm 22 in this embodiment, it is possible to incorporate them inside the second arm 22. Further, although the front stage speed reducer 54, the eccentric oscillation type speed reducer 27, and the rear stage speed reducer 63 are provided at the distal end part of the second arm 22 in the above described embodiment, it is possible to provide them at the base end part of the second arm 22 close to the third joint part 21.

INDUSTRIAL APPLICABILITY

This invention can be applied to an industrial field of an industrial robot which employs an eccentric oscillation type speed reducer.

The invention claimed is:
1. A structure of a swing part of an industrial robot provided with a fixed part and a rotary part, said structure comprising a front stage speed reducer which reduces speed of rotation inputted from a drive motor and outputs the rotation at the reduced speed, and a main speed reducer which reduces the speed of the rotation inputted from the front stage speed reducer and outputs the rotation to the rotary part, said main speed reducer is an eccentric oscillation speed reducer which includes a casing provided with a number of pin teeth on an inner periphery thereof, a pinion contained in said casing and having external teeth in mesh with said pin teeth, a carrier inserted into said casing and adapted to rotate relative to said casing, and a plurality of crank pins rotatably supported by said carrier and having eccentric parts respectively inserted into said pinion, said crank pins being rotated synchronously with the rotation from said front stage speed reducer thereby to rotate the pinion eccentrically, wherein either one of said casing and said carrier is fixed to said fixed part, and the reduced rotation is outputted from the other of said casing and said carrier to the rotary part, said front stage speed reducer including an external gear speed reducer which has first external gears which are provided at input side ends of all the crank pins, and a second external gear which is coaxial with said casing or said carrier and to which the rotation from the drive motor is inputted, characterized in that:
total reduction ratio of said external gear speed reducer and said eccentric oscillation speed reducer is 80 to 200,
a diameter D of a circle passing a center of the pin teeth being in a range of 150 to 200 mm, and
a value N obtained by dividing reduction ratio M of said eccentric oscillation speed reducer by said diameter D is smaller than 0.20.

2. A structure of a swing part of an industrial robot according to claim 1, wherein said value N is smaller than 0.17.

3. A structure of a swing part of an industrial robot according to claim 1, wherein a small gear coaxial with said casing or said carrier is provided at an output end of the casing or the carrier which inputs said reduced rotation, and a large gear in mesh with said small gear is provided on said rotary part, whereby a rear stage speed reducer including these small and large gears further reduces the speed of the rotation.

* * * * *